Patented Nov. 13, 1934

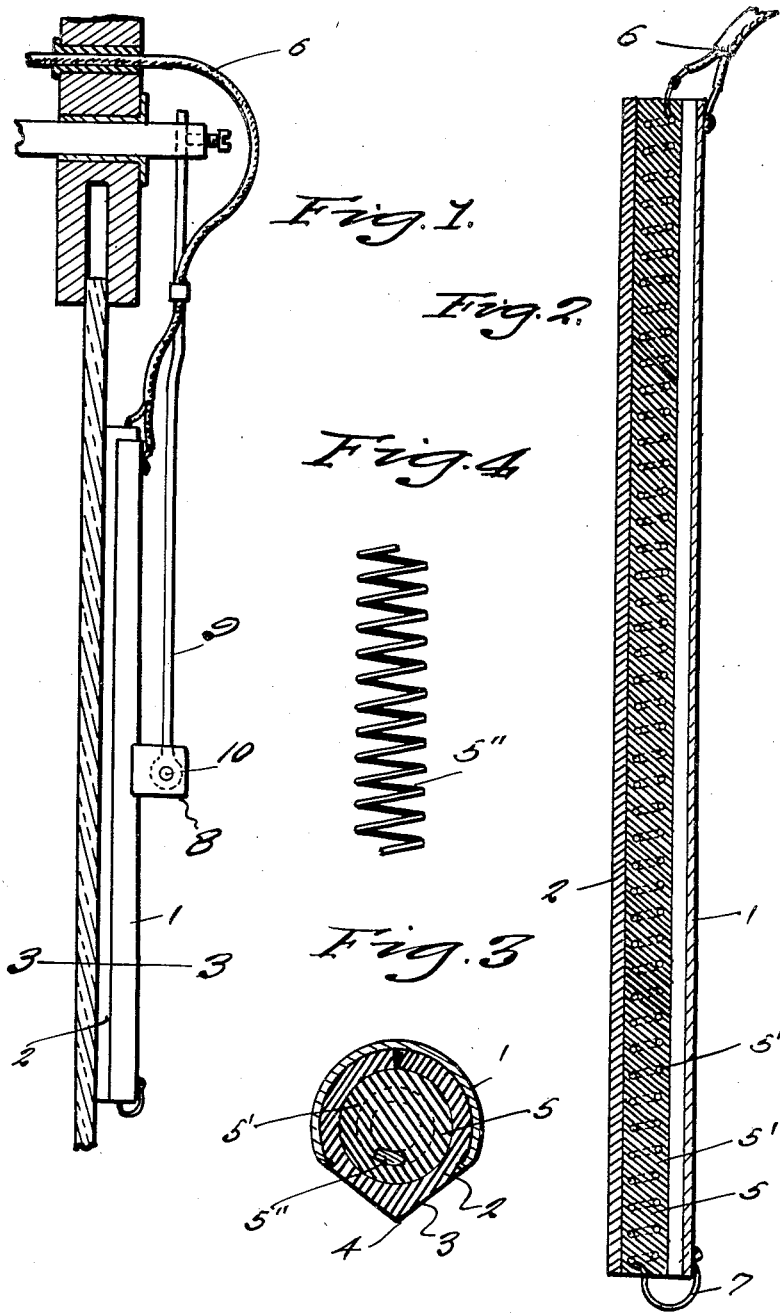

1,980,254

UNITED STATES PATENT OFFICE 1,980,254

COMBINED WINDSHIELD WIPER AND HEATER

Forrest P. Cartwright, Grand Junction, Iowa

Application March 6, 1934, Serial No. 714,323

1 Claim. (Cl. 15—250)

This invention relates to a combined windshield wiper and heater, the general object of the invention being to provide a simple form of device for wiping and heating a windshield, with means whereby the device can be attached to the ordinary type of depending arm of a windshield wiper.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a sectional view through portion of a windshield, showing the invention in use.

Figure 2 is a longitudinal sectional view through the device.

Figure 3 is a section on line 3—3 of Figure 1.

Figure 4 is a fragmentary view of the heating coil.

In this drawing, the numeral 1 indicates a substantially semi-cylindrical tube of metal and the numeral 2 indicates a split tubular member of rubber or the like, the split part of which comes within the casing 1 and that part which projects from the casing being of substantially wedge shape, as shown at 3, so as to provide a wiping edge 4. The heating element is shown at 5 and is composed of a cylindrical body of insulating material 5' and the wire coil 5''. This heating element is located in the casing 2 and the material 5' should not only be of non-conducting material, but should also be a good heat conductor so that the heat from the coil will heat the wedge-shaped part of the rubber casing to cause the same, as it moves over the transparent member of the windshield to heat and melt snow and ice collecting on the windshield at the same time it wipes the transparent member. A pair of conductors 6 is connected to the battery or other suitable source of electricity on the vehicle and one conductor is connected to the upper end of the coil and the other is connected to the top of the metal casing 1, as shown more particularly in Figure 2, and the other end of the coil is grounded on the metal casing 1, as shown at 7.

A bracket 8 is connected to an intermediate part of the casing 1 and the depending arm 9 of the windshield wiper is pivoted to the bracket, as shown at 10.

Thus it will be seen that I have provided simple means for heating the transparent member of a windshield at the same time said member is being wiped.

I may use litharge for the part 5' of the heating element and nichrome for the coil.

As will be seen, the casing 1 holds the tubular member 2 in closed position and in proper position for wiping and heating the transparent member and by removing the parts from the casing 1, the tubular member 2 can be opened so that the heating element can be removed and substituted by a new one or the parts can be repaired, if desired.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:

A combined windshield wiper and heater comprising a substantially semi-cylindrical casing of metal, a resilient substantially cylindrical member having a substantially wedge-shaped outwardly projecting side part, with that portion of the resilient member opposite the wedge-shaped portion having a longitudinally extending slit therethrough extending from one end to the other, said resilient member being located in the casing, with its wedge part projecting from the casing and the slitted part at the rear of the casing, an elongated body of insulating material of circular shape in cross section fitting in the resilient member, a coil embedded in the said body, conductors, one connected to the upper end of the casing and the other to the upper end of the coil, and a wire connecting the lower end of the coil to the casing.

FORREST P. CARTWRIGHT.